(12) United States Patent
Coulter et al.

(10) Patent No.: US 8,262,025 B2
(45) Date of Patent: Sep. 11, 2012

(54) AIRCRAFT STRUCTURE

(75) Inventors: Steven Coulter, Bristol (GB); Simon King, Bristol (GB)

(73) Assignee: Airbus Operations Limited, Bristol (GB)

( * ) Notice: Subject to any disclaimer, the term of this patent is extended or adjusted under 35 U.S.C. 154(b) by 465 days.

(21) Appl. No.: 12/458,663

(22) Filed: Jul. 20, 2009

(65) Prior Publication Data

US 2010/0044511 A1 Feb. 25, 2010

(30) Foreign Application Priority Data

Aug. 19, 2008 (GB) .................................... 0815021.1

(51) Int. Cl.
*B64C 1/00* (2006.01)

(52) U.S. Cl. ..................................... 244/123.1; 244/131

(58) Field of Classification Search .................. 244/131, 244/123.1, 213, 215, 117 R
See application file for complete search history.

(56) References Cited

U.S. PATENT DOCUMENTS

| | | | |
|---|---|---|---|
| 3,140,066 A * | 7/1964 | Sutton et al. .................. 244/215 |
| 4,687,162 A | 8/1987 | Johnson et al. | |
| 5,110,072 A | 5/1992 | Owl | |
| 2002/0100840 A1 * | 8/2002 | Billinger et al. .............. 244/131 |

OTHER PUBLICATIONS

Search Report for GB 0815021.1 dated Dec. 18, 2008.

* cited by examiner

*Primary Examiner* — Timothy D Collins
*Assistant Examiner* — Jamie S Stehle
(74) *Attorney, Agent, or Firm* — Nixon & Vanderhye P.C.

(57) ABSTRACT

An aircraft wing includes a rear spar, a first skin, a second skin overhanging and converging to an opening of width (A), a support structure including a bracket engaging the spar and skins and a rib engaging the bracket via a rib attachment portion with a dimension (C) less than dimension (A).

12 Claims, 5 Drawing Sheets

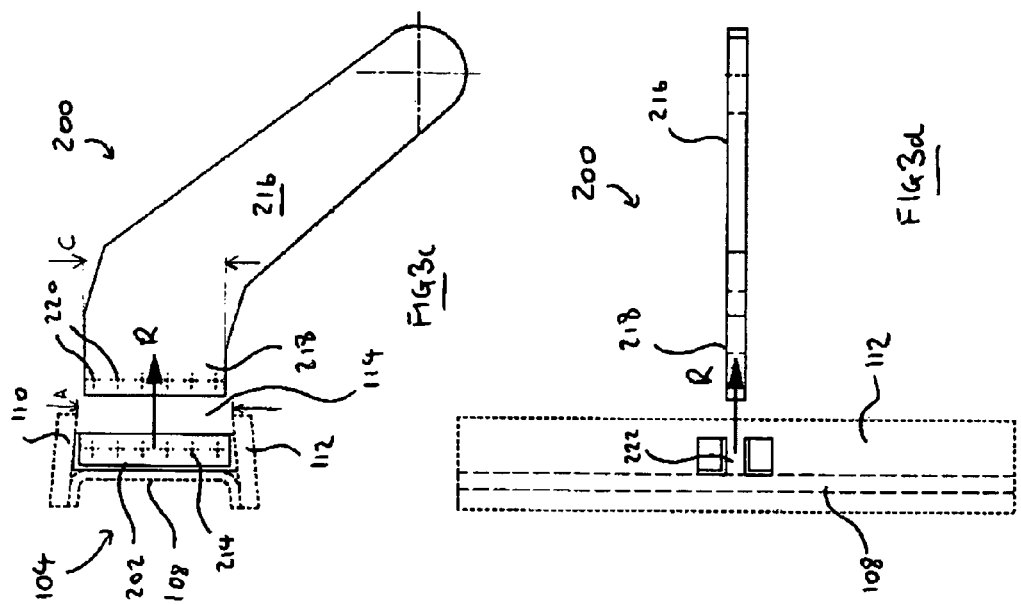
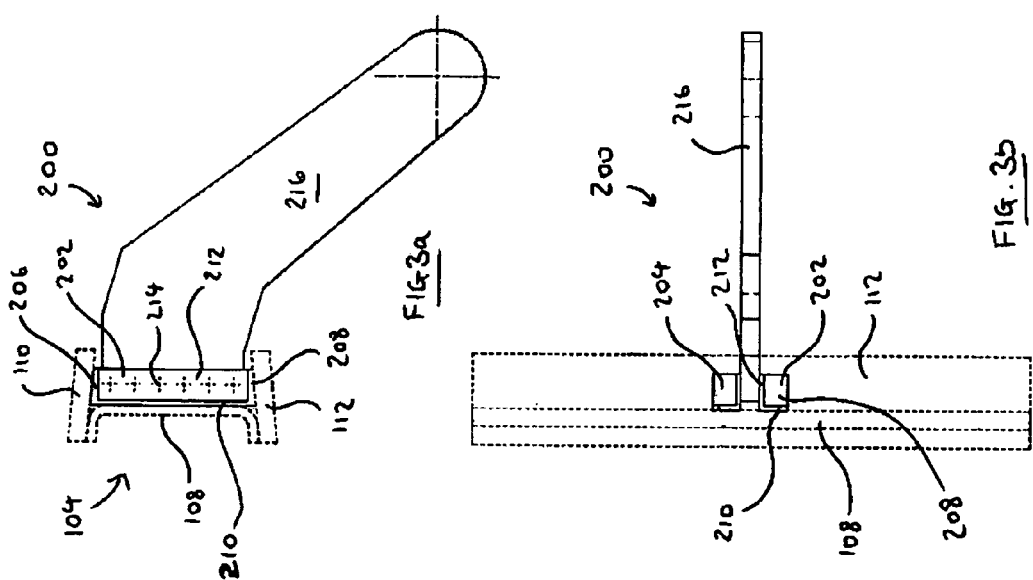

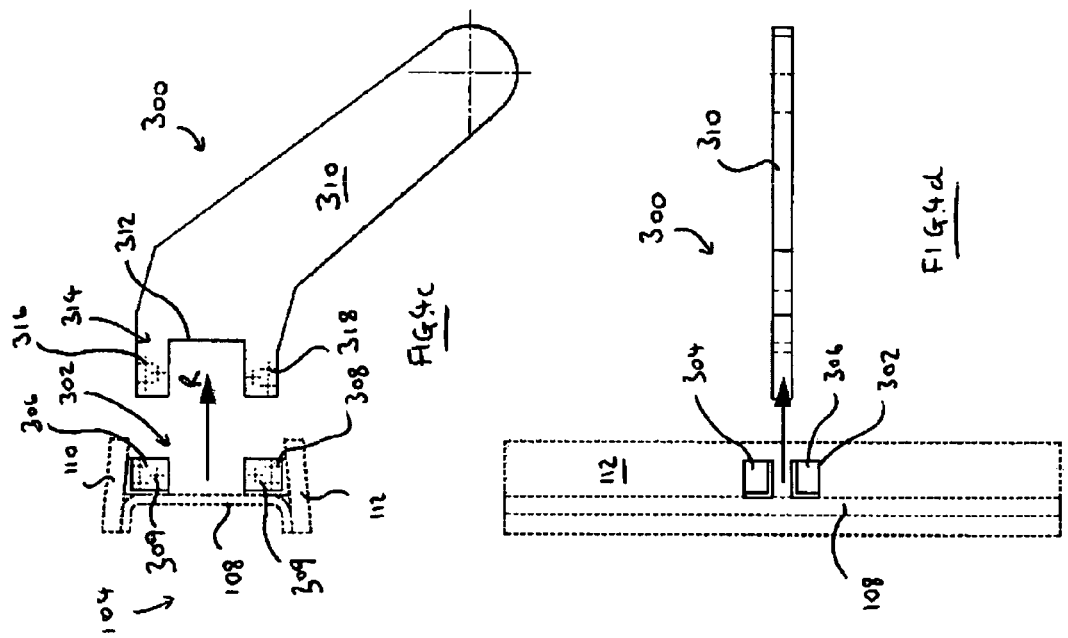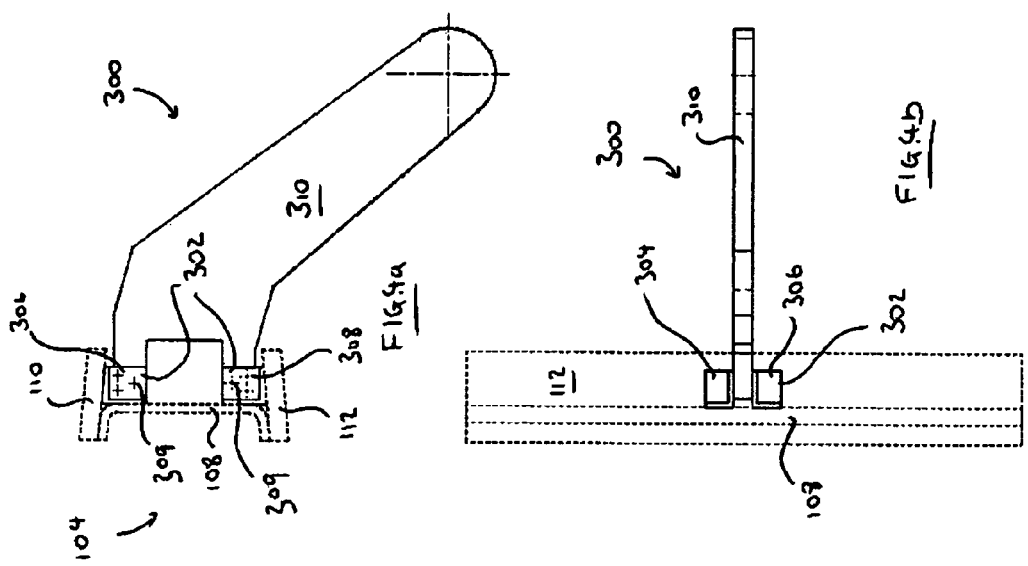

AIRCRAFT STRUCTURE

This application claims priority to British Application No. 0815021.1 filed 19 Aug. 2008, the entire contents of which is hereby incorporated by reference.

FIELD OF THE INVENTION

The present invention relates to a structure for mounting aircraft control surfaces. More specifically, the present invention relates to a cantilever rib for mounting a flap from a rear spar of a wing.

BACKGROUND OF THE INVENTION

Control surfaces are used on aircraft to influence the passage of fluid over various flight surfaces such as wings. Flaps, for example, are a type of control surface which are mounted to the rear of a wing and can be rotated with respect to the wing trailing edge to change the shape of the aerofoil profile of the wing assembly as a whole. This helps prevent wing stall at low speeds (e.g. during landing) when the flaps are fully deployed, and increases efficiency of the wing at high speeds (e.g. during cruise) when the flaps are stowed. Slats are another type of control surface positioned at the leading edge of the wing.

Both immovable and movable components (e.g. control surfaces such as flaps) need to be securely mounted to the aircraft. Flaps, for example, can be mounted to the wings of the aircraft in a variety of ways, for example via an underslung beam attached to the underside of the aircraft wing, or via a cantilever rib mounted directly to, and projecting perpendicularly from, a rear spar of the wing.

Cantilever ribs are attached to the rear spar of an aircraft wing and are generally bolted directly to the wing skin overhanging the spar and to the spar itself. The wing skin overhanging at both the upper and lower surfaces of the wing trailing edge and the upper and lower skin surfaces tends to converge. As such the vertical distance between the upper and lower skin at the trailing edges is somewhat less than the distance between the skins proximate the spar, i.e. the position at which the rib needs to be attached. Consequently, the rib cannot fit between the skins without them being spread.

As cantilever ribs are prone to damage (due to their exposed position on the aircraft), they need to be replaced frequently. On metal skinned aircraft this has been achieved by spreading the skins to increase the distance between their trailing edges.

Metal components can be repeatedly deformed in this manner as they generally have a high yield strength and will return to their original shape once released.

Composite (e.g. carbon reinforced plastic) components, which are now starting to be used for aircraft wing structures are more prone to damage following significant and/or repeated deformation such as spreading. As such, replacement of cantilever ribs in aircraft wings of this type is problematic.

It is an aim of the invention to provide an improved aircraft structure.

SUMMARY OF THE INVENTION

According to a first aspect of the invention there is provided an aircraft control surface support structure comprising a wing spar, a first panel overhanging a first side of the spar and a second panel overhanging a second side of the spar opposite the first side, in which the first and second panels converge to a first opening having a first width between respective edges of the first and second panels, the structure further comprising a bracket engaging the spar and the first and second panels proximate the spar such that the bracket is retained relative to the spar, and a rib comprising a rib mounting portion having a mounting means removably engaged with the bracket, which mounting portion has a first dimension sized to be equal to or less than the first width to permit passage of the first portion through the first opening to engage and disengage the bracket without rotation of the rib.

Advantageously, the rib can therefore be replaced without deformation of the panels or skin of the aircraft wing.

The bracket may be unitary. Alternatively the bracket may comprise a pair of sub brackets, the first sub bracket engaging the spar and the first panel and the second sub bracket engaging the spar and second panel.

Preferably the structure comprises a further bracket, the bracket and the further bracket being positioned to define a receiving formation for the mounting portion.

According to a second aspect of the invention there is provided an aircraft comprising a support structure according to the first aspect of the present invention.

BRIEF DESCRIPTION OF THE DRAWINGS

An example structure will now be described with reference to the accompanying figures in which:

FIG. 3a is a side section view of a part of a first aircraft structure in accordance with the present invention, FIG. 3b is a plan section view of the structure of FIG. 3a, FIG. 3c is a side section view of the structure of FIG. 3a during a replacement operation, FIG. 3d is a plan section view of the structure of FIG. 3a during a replacement operation, FIG. 4a is a side section view of a part of a second aircraft structure in accordance with the present invention, FIG. 4b is a plan section view of the structure of FIG. 4a, FIG. 4c is a side section view of the structure of FIG. 4a during a replacement operation, FIG. 4d is a plan section view of the structure of FIG. 4a during a replacement operation, and, FIGS. 4e and 4f are perspective views of the aircraft structure of FIG. 4a.

DETAILED DESCRIPTION OF THE PREFERRED EMBODIMENT

Figure 1:
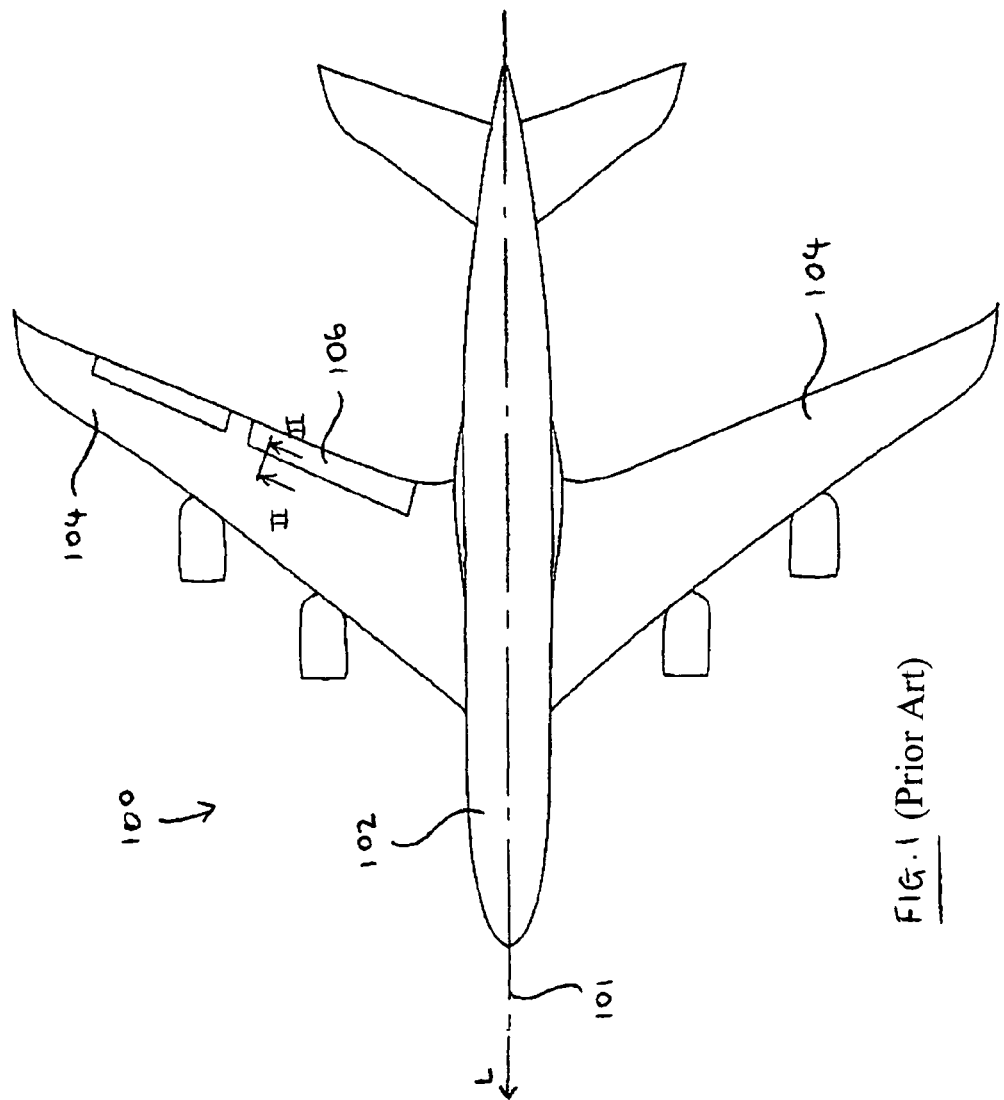
FIG. 1 is a plan view of an aircraft.

Referring to FIG. 1, a passenger aircraft 100 comprises a fuselage 102 and wings 104. The aircraft 100 defines a main longitudinal axis 101 parallel to the line of flight L. Each wing comprises at least one flap 106 which can be selectively deployed or stowed as known in the art.

Figure 2B:
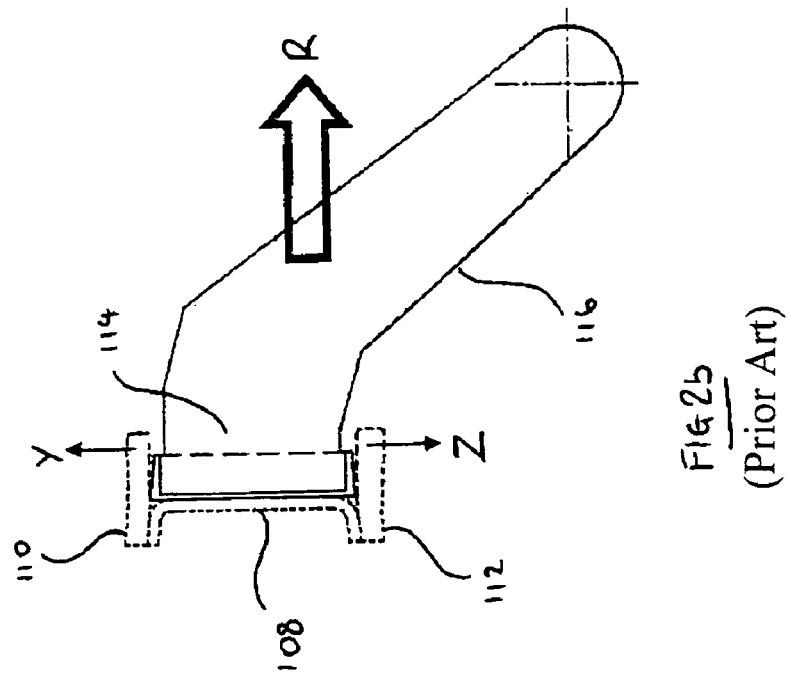
FIGS. 2a and 2b are side section views of a part of an aircraft along line II-II in FIG. 1.
Figure 2A:
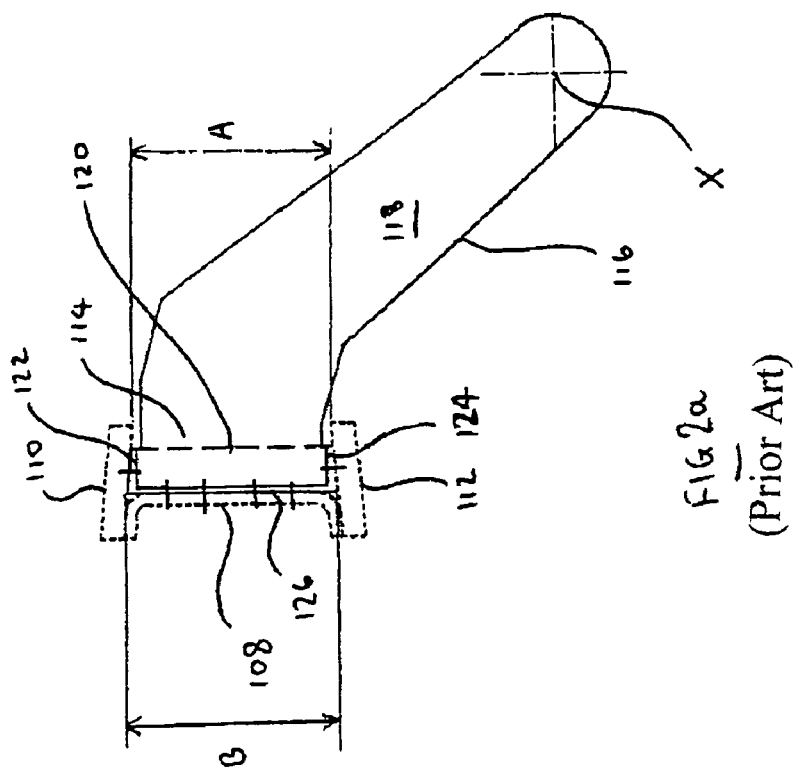

Referring to FIGS. 2a and 2b, each wing 104 comprises a rear spar 108 in addition to an upper skin 110 and a lower skin 112. The upper and lower skins 110, 112 overhang the rear spar 108 and converge to an opening 114 of height A. The height A is defined as the vertical distance between the skin rear edges. It will be noted that at the point at which the skins 110, 112 meet the spar 108 they are distance B apart, where B is greater than A (due to the convergence of the skins).

A cantilever rib 116 is mounted to the rear spar 108 and skins 110, 112 to mount the flap 106 (shown in FIG. 1) about a pivot axis X. The cantilever rib 116 is unitary and comprises a downwardly depending arm 118 at a first end of which the pivot axis X is defined. At a second end of the arm 118 an attachment structure 120 is defined comprising a pair of horizontal flanges 122, 124 and a vertical flange 126. The attachment structure 120 is shaped to nestle between the skins 110, 112 and the spar 108 with the horizontal flanges 122, 124 bolted to the skins 110, 112 respectively and the vertical flange 126 bolted to the spar 108.

It will be noted therefore that the vertical flange 126 is approximately equal to B in height in order to securely fit between the skins 110, 112. Referring to FIG. 2b the skins 110, 112 have to be spread in directions Y and Z respectively in order to open the opening 114 to a height equal to B in order to remove the rib 116 in removal direction R.

The rib 116 is an interchangeable component and has to be frequently replaced in use due to wear and/or damage and as such the skins 110, 112 have to be repeatedly deformed. This is a problem as repeated deformation can cause damage to the skins 110, 112 and if they are plastically deformed this may affect the aerodynamic characteristics of the wing 104. This is a serious problem if the skins 110, 112 are composite as composites generally have a lower yield stress than metals and are less easy to deform back to their original shape should they be damaged.

FIGS. 3a to 3d show a cantilever rib structure 200 in accordance with the present invention. Aircraft components common with FIGS. 1 to 2d are numbered identically.

The structure 200 comprises a first bracket 202 and a second bracket 204. The brackets 202, 204 are identical, although oppositely orientated and as such only the bracket 202 will be described in detail. The bracket 202 is generally prismatic, L shaped in cross section and comprises top and bottom flanges 206, 208 respectively. The L-shaped section comprises a rear flange 210 and a projecting flange 212 each making a leg of the "L".

The flanges 206, 208, 210 each define bores (not shown) for receiving bolts for attachment to the wing 104 as will be described below. The flange 212 defines bores 214 for receiving bolts as will be described below.

The structure comprises a cantilever rib 216 formed from a plate comprising stiffening ribs (not shown). The rib 216 comprises an attachment region 218 defining a plurality of bores 220.

The brackets 202, 204 are bolted to the spar 108 and the skins 110, 112 to retain the brackets 202, 204 relative thereto. The brackets 202, 204 are positioned with a rib receiving gap 222 defined therebetween. The brackets 202, 204 only need to be installed once (they are not interchangeable) and as such may be installed at the same time as the wing 104 is assembled, thus eliminating the need to spread the skins 110, 112 at all. Alternatively, the brackets 202, 204 may be retrofitted by spreading the skins 110, 112 but as the brackets 202, 204 will not need to be removed the skins 110, 112 will only need to be spread once.

Once the brackets 202, 204 are installed, the attachment region 218 of the rib 216 is inserted into the gap 222 and the rib 216 is bolted in place through bores 214, 220. The rib 216 can be replaced by removing the bolts and removing the rib 216 in direction R. It will be noted that the height of the attachment portion of the rib, C, is equal to or less than the height A of the gap 114. Therefore the rib 216 can be easily removed from the gap 114 and replaced without the skins 110, 112 being spread.

FIGS. 4a to 4f show a cantilever rib structure 300 in accordance with the present invention. Aircraft components common with FIGS. 1 to 2d are numbered identically.

Structure 300 is similar to the rib structure 200. Only the differences will be described. The structure 300 comprises a first component bracket 302 and a second component bracket 304. The brackets 302, 304 are identical, although oppositely orientated and as such only the bracket 302 will be described in detail.

The component bracket 302 comprises a first sub bracket 306 and a second sub bracket 308. The sub brackets represent the end sections of the bracket 202 (i.e. as if a centre portion of the bracket 202 had been removed). They each define bores 309.

A cantilever rib 310 is similar to the cantilever rib 216 with the exception that a cut-out 312 is provided in an attachment region 314. The attachment region 314 therefore comprises two lugs 316, 318 each with bores defined therethrough for the attachment of the rib 310 to the component bracket 302.

Advantageously, the component brackets 302, 304 can be installed to the assembled wing 104 without having to spread the skins 110, 112.

Figure 4F:
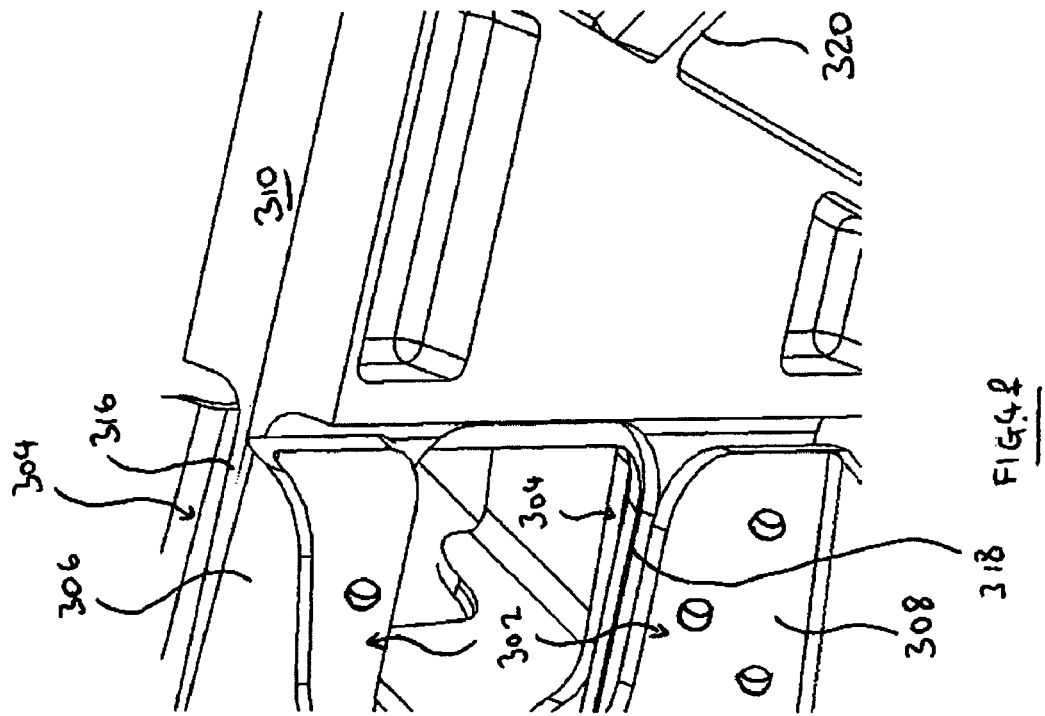
Figure 4E:
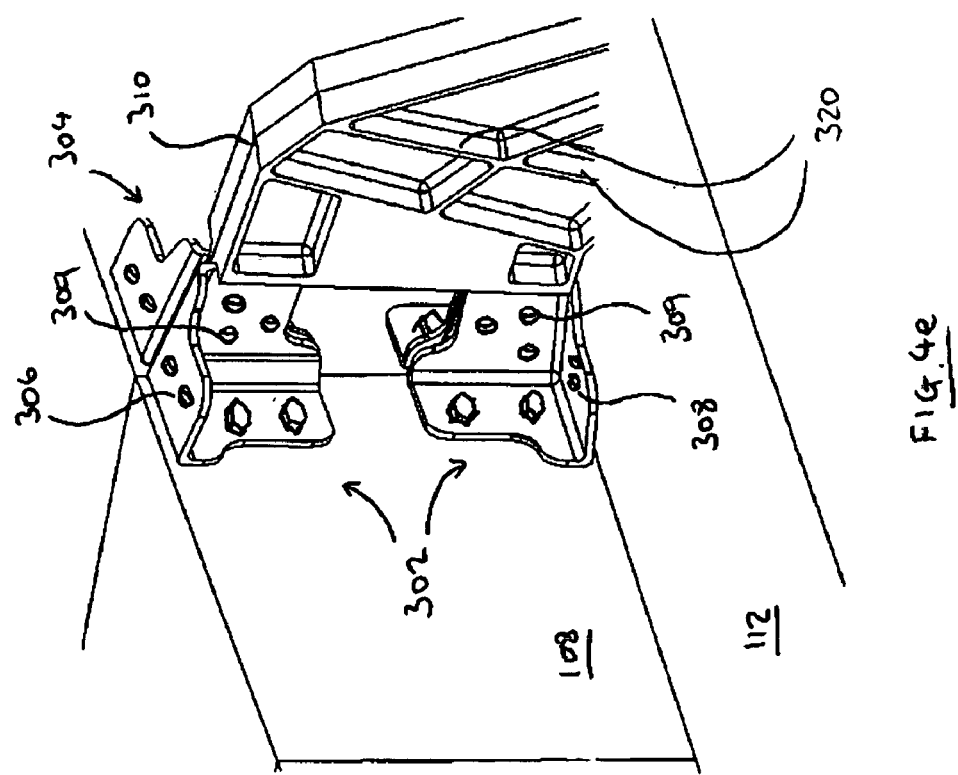

Referring to FIGS. 4e and 4d the arrangement of the brackets 302, 304 can be seen in more detail. The rib 310 comprises stiffening ribs 320

Variations of the above embodiment fall within the scope of the present invention.

The bracket may comprise a single component to which the rib attaches on one side only.

The bracket may be positioned to mount a component (e.g. a control surface) to a leading edge of a wing.

The component bracket may comprise a further sub bracket disposed between the two sub brackets 306, 308.

The brackets 202, 204 may be orientated with their projecting flanges 212 projecting non-perpendicularly from the spar 108 to allow the rib 216 to project at any desired angle when installed. For example, the rib 216 may be installed to project parallel to the line of flight L of the aircraft 100 thus reducing the drag produced by the rib's projection from the outer mean line (OML) of the aircraft.

The invention claimed is:

1. An aircraft component support structure for mounting an aircraft component on an aircraft wing, said wing comprising a wing spar, a first wing skin panel overhanging a first side of the spar and a second wing skin panel overhanging a second side of the spar opposite the first side, in which the first and second panels converge to a first opening having a first width between respective edges of the first and second panels, the support structure further comprising:

a bracket engaging the spar such that the bracket is retained relative to the spar, said bracket comprising a rib attachment flange projecting from said spar; and a rib comprising a rib mounting portion removably fixed with the bracket rib attachment flange, which mounting portion has a first dimension sized to permit passage of the rib mounting portion through the first opening to engage and disengage the bracket.

2. An aircraft component support structure according to claim 1 in which the bracket comprises a pair of sub brackets, the first sub bracket engaging the spar and the first panel and the second sub bracket engaging the spar and second panel.

3. An aircraft component support structure according to claim 1 comprising a further bracket, the bracket and the further bracket being positioned to define a receiving formation for the mounting portion.

4. An aircraft component support structure according to claim 3 in which the bracket and the further bracket are identical but oppositely oriented.

5. An aircraft component support structure according to claim 3 in which the bracket and the further bracket are offset to define a rib receiving formation to receive the rib mounting portion.

6. An aircraft component support structure according to claim 1 in which the bracket attachment flange projects at a rib angle from the spar.

7. An aircraft component support structure according to claim 6 in which the rib angle is 90 degrees.

8. An aircraft component support structure according to claim 6 in which the spar defines a sweep angle of said aircraft wing and the rib angle is substantially equal to the sweep angle and said rib angle is substantially parallel with a longitudinal axis of an aircraft.

9. An aircraft subassembly comprising an aircraft control surface mounted to an aircraft wing spar comprising an aircraft component support structure according to claim 1.

10. An aircraft subassembly according to claim 9 in which the control surface is a flap.

11. An aircraft comprising a support structure or subassembly according to claim 1.

12. An aircraft component support structure according to claim 1 in which the bracket, in addition to the spar, engages said first and second panels proximate the spar.

* * * * *